US012001291B2

(12) United States Patent
Mohanraj et al.

(10) Patent No.: US 12,001,291 B2
(45) Date of Patent: Jun. 4, 2024

(54) PROACTIVE DATA PROTECTION BASED ON WEATHER PATTERNS AND SEVERITY

(71) Applicant: EMC IP Holding Company LLC, Hopkinton, MA (US)

(72) Inventors: Vetrivel Mohanraj, Tamilnadu (IN); Srinivasa Raju Chamarthy, Karnataka (IN); Abhijit R. Bangera, Mangalore (IN); Suhas Jayasheela, Bangalore (IN); Dhanya Y D, Chikmaglur (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 149 days.

(21) Appl. No.: 17/225,650

(22) Filed: Apr. 8, 2021

(65) Prior Publication Data

US 2022/0327028 A1    Oct. 13, 2022

(51) Int. Cl.
  *G06F 16/20* (2019.01)
  *G06F 11/14* (2006.01)
  *G06F 16/28* (2019.01)
  *G06N 5/04* (2023.01)

(52) U.S. Cl.
  CPC ........ *G06F 11/1461* (2013.01); *G06F 16/285* (2019.01); *G06N 5/04* (2013.01); *G06F 2201/84* (2013.01)

(58) Field of Classification Search
  CPC ............... G06F 16/285; G06F 11/1461; G06F 2201/84; G06N 5/04
  See application file for complete search history.

(56) References Cited

U.S. PATENT DOCUMENTS

| 7,542,852 | B1* | 6/2009 | Rose ................. | G01W 1/10 |
| | | | | 73/170.16 |
| 8,275,522 | B1* | 9/2012 | Groeneweg ......... | G06Q 10/06 |
| | | | | 701/50 |
| 8,779,917 | B1* | 7/2014 | White ................. | G08B 27/005 |
| | | | | 340/539.11 |
| 9,297,723 | B1* | 3/2016 | Hofmann ............. | G06N 20/00 |
| 9,548,828 | B1* | 1/2017 | Kuznetsov ........... | H04W 4/021 |
| 10,824,741 | B1* | 11/2020 | Porter ................ | H04L 12/2803 |
| 2011/0264664 | A1* | 10/2011 | Xiao .................. | G06F 16/31 |
| | | | | 707/E17.014 |
| 2016/0135006 | A1* | 5/2016 | Fjeldsoe-Nielsen ......... |  |
| | | | | H04B 1/3827 |
| | | | | 455/456.3 |
| 2016/0335725 | A1* | 11/2016 | Philbrick ............ | G06Q 40/08 |
| 2017/0099357 | A1* | 4/2017 | Haupt ................ | H04L 67/12 |
| 2017/0134895 | A1* | 5/2017 | Rabb ................. | G08B 29/24 |

(Continued)

Primary Examiner — Tarek Chbouki
(74) Attorney, Agent, or Firm — Amin, Turocy & Watson, LLP

(57) ABSTRACT

Techniques can be implemented to adjust a level of data protection for a device based on predictions of the weather. A physical location of the device can be determined. A first weather prediction from a first weather source for the physical location for a first time period, and a second weather prediction from a second weather source for the physical location for a second time period can be determined. The first weather prediction and the second weather prediction can be combined to produce a combined weather prediction for a third time period. The combined weather prediction can be analyzed to determine a weather categorization. Based on the weather categorization, a level of data protection of the device can be increased for the third time period.

20 Claims, 10 Drawing Sheets

(56) References Cited

U.S. PATENT DOCUMENTS

| | | | |
|---|---|---|---|
| 2017/0329339 A1* | 11/2017 | Gordon | A62B 99/00 |
| 2018/0218303 A1* | 8/2018 | Cole | G06N 20/00 |
| 2019/0162875 A1* | 5/2019 | Cousins | G01W 1/10 |
| 2020/0132884 A1* | 4/2020 | Rothenberg | G06N 20/00 |
| 2021/0049077 A1* | 2/2021 | Gibbons, Jr. | G06F 11/3058 |
| 2021/0349795 A1* | 11/2021 | Sangala | G06F 11/327 |

* cited by examiner

500

| Alert/ Classification 502 | Wind Speed (Km/h) 504 | Magnitude (in Richter) 506 | Precipitation (in mm) 508 | Temperature (Degrees Celsius) 510 |
|---|---|---|---|---|
| 512a → RED | >150 in <=2 days | >3.9 | >120 in <=2 days | <0° or >35° in <=2days |
| 512b → YELLOW | <=150 in >2 days | <3.9 | <=120 in >2 days | <0° or >35° in >2 days |

FIG. 5

PROACTIVE DATA PROTECTION BASED ON WEATHER PATTERNS AND SEVERITY

BACKGROUND

Administrators of data centers can strive to avoid data loss or data unavailability. Data loss can comprise a situation where data is destroyed and cannot be recovered. Data unavailability can comprise a situation where data cannot be accessed for a period of time, though the data has not been permanently lost.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can determine a physical location of a device. The system can determine a first weather prediction from a first weather source for the physical location for a first time period, and a second weather prediction from a second weather source for the physical location for a second time period. The system can combine the first weather prediction and the second weather prediction to produce a combined weather prediction, the combined weather prediction occurring during a third time period, the third time overlapping with the first time period or the second time period. The system can analyze the combined weather prediction to determine a weather categorization. Based on the weather categorization, the system can increase a level of data protection of the device for the third time period.

An example method can comprise determining, by a system comprising a processor, a physical location of a device. The method can further comprise determining, by the system, a first environmental prediction from a first source and applicable to the physical location for a first time period. The method can further comprise determining, by the system, a second environmental prediction from a second source and applicable to the physical location for a second time period. The method can further comprise determining, by the system, a third environmental prediction based on the first environmental prediction and the second environmental prediction, the third environmental prediction occurring during a third time period that overlaps with the first time period or the second time period. The method can further comprise categorizing, by the system, the third environmental prediction, resulting in a categorization. The method can further comprise, based on the categorization, modifying, by the system, a level of data protection of the device for the time period.

An example non-transitory computer-readable medium can comprise instructions that, in response to execution, cause a system comprising a processor to perform operations. These operations can comprise determining an environmental prediction applicable to a physical location of a computer for a time period, wherein the environmental prediction comprises a prediction that an environmental condition associated with the computer will change at a time within the time period. These operations can comprise determining a categorization based the environmental prediction. These operations can comprise based on the categorization, modifying a level of data protection of the computer for the time period.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 5 illustrates example classifications that can facilitate proactive data protection based on weather patterns and severity, in accordance with certain embodiments of this disclosure;

DETAILED DESCRIPTION

Overview

Figure 1:
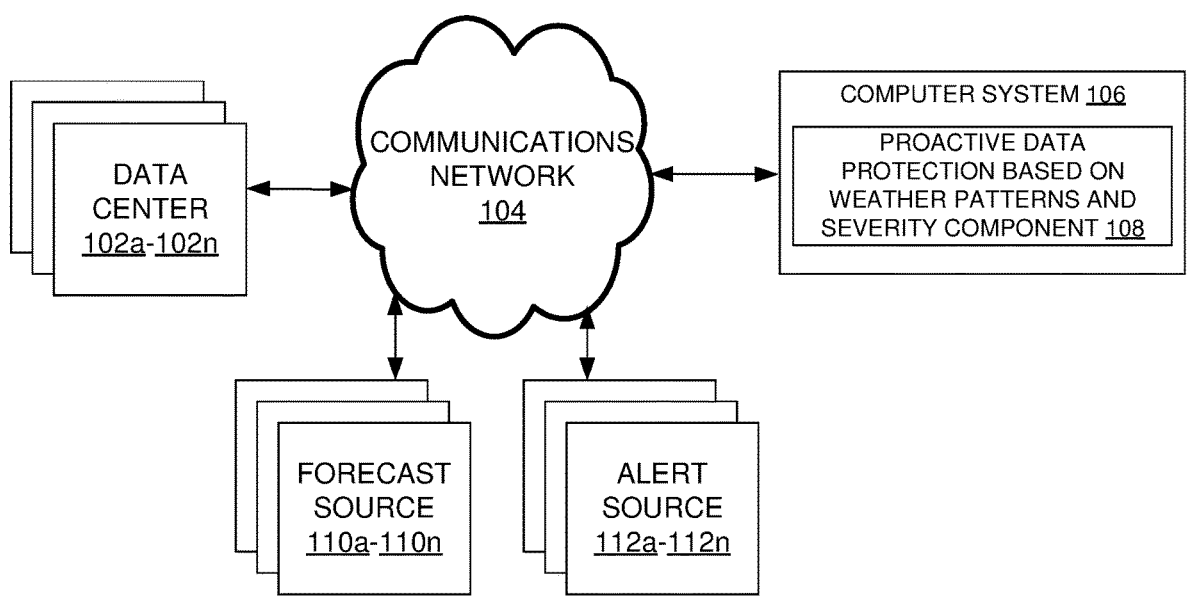
FIG. 1 illustrates an example system architecture that can facilitate proactive data protection based on weather patterns and severity, in accordance with certain embodiments of this disclosure.

Critical weather conditions can impact data centers, which can result in data loss or a loss of business continuity requirements, because data protection (e.g., snapshots, backups, or replications) can be based on a static point in time or scheduled operations. Critical weather conditions that can negatively impact data centers can include weather patterns and natural disasters such as thunderstorms, flooding, heavy rains, tornados, hurricanes, earthquakes, and tsunamis.

In a case of critical weather conditions, administrators or users can need to manually upscale protection requirements/schedules prior to the occurrence of an event. In critical conditions, it can be that an entire data center is at risk and systems within a data center lack transparency over external conditions or factors.

There are not currently systems or procedures that provide analytics and refined data sets as events or alerts to data centers or computer systems. As there are no such systems or procedures, there can be a lack of automated implementations and procedures where computer systems can be configured to take automated decisions based on policies that are predefined to mitigate against data loss, unavailability, or business continuity.

As weather patterns and events play an important role in data centers for administrators to prioritize protection needs, an improvement over current techniques can involve using analytics to provide weather events and alerts to computer systems and data centers so that these computer systems and data centers can utilize the refined events and alerts to take action based on pre-defined policies. For example, events can be categorized as RED, GREEN, or YELLOW with a predicted event timeline, and a computer system can utilize this data to activate respective policies.

A centralized information gathering system can collect and process data from different sources and accumulate weather predictions and weather alerts for a particular geographical location. This accumulated data can be analyzed based on a geographical location of a system or data center, and the data can be classified to produce an alert for a data center to use to modify its level of data protection. In some examples, the geographical location tagging for specific systems can be set as part of provisioning a system, or as part of the system registering with another system that facilitates proactive data protection based on weather patterns and severity. This geographical location information can be extracted from a weather system, and the data can be egressed through to the respective computer systems that can be backed up. These techniques can be implemented in a cloud platform that provide these critical weather condition alerts based on a standardized application programming interface (API).

Examples of weather events can be as follows. Predictable events can generally be events that can be gathered from different weather sources. In some examples, to reduce false positives, weather predictions can be gathered from multiple sources, and churned through analytics and techniques to provide meaningful and simplified actionable events or alerts. Examples of predictable events can include, weather data for the next seven days for a particular geographical location, a probability of flooding or inundation, a probability of thunderstorms, a probability of heavy winds, a probability of tornados, a probability of hurricanes, a probability of a blizzards or heavy snow, a probability of sand storms, and a probability of volcano eruptions.

Another type applicable to weather events can be immediate/non-predictable events Immediate/non-predictable events can comprise events that are unpredictive and have small or no lead times for taking immediate actionable procedures. In some examples, these alerts can be used in scenarios where systems or data centers have active protection implementations (e.g., synchronous replication) with robust data recovery plans. In some examples, the actions taken can involve doing a failover of systems in sync-replicated data sets. Examples of immediate/non-predictable events can include earthquakes, a tsunami probability after an earthquake, and bush fires or forest fires.

Alerts and events can be categorized, such as RED, YELLOW, or GREEN. It can be appreciated that different categorizations can be implemented, such as those that implement more or fewer than three categories, like with the RED/YELLOW/GREEN categorization. Along with categorized alerts, a system can also provide notices such as the following: an event type can have a SCHEDULE of the event embedded in a case of predicted events; an event type can include a probability of occurrence that can be derived from different weather sources (these probabilities can be, e.g., HIGH, MEDIUM, or LOW); in a case of non-predictable events, an alert can include an impact (an impact can be, e.g., HIGH, MEDIUM, or LOW), and include information such as "SCHEDULE: IMMEDIATE ATTN;" an alert can be provided in different formats, e.g., a JavaScript Object Notation (JSON) format, a YAML Ain't Markup Language (YAML) format, or a Terse Markup Language (TML) format.

Example Architectures and Classifications

FIG. 1 illustrates an example system architecture 100 that can facilitate proactive data protection based on weather patterns and severity, in accordance with certain embodiments of this disclosure.

As depicted, system architecture 100 comprises data center 102a-102n, communications network 104, computer system 106, forecast source 110a-110n, and alert source 112a-112n. In turn, computer system 106 comprises proactive data protection based on weather patterns and severity component 108.

There can be examples with one or more instances each of data center 102a-102n, forecast source 110a-110n, and alert source 112a-112n. In the example of system architecture 100, there are depicted n instances of each of data center 102a-102n, forecast source 110a-110n, and alert source 112a-112n.

Figure 10:
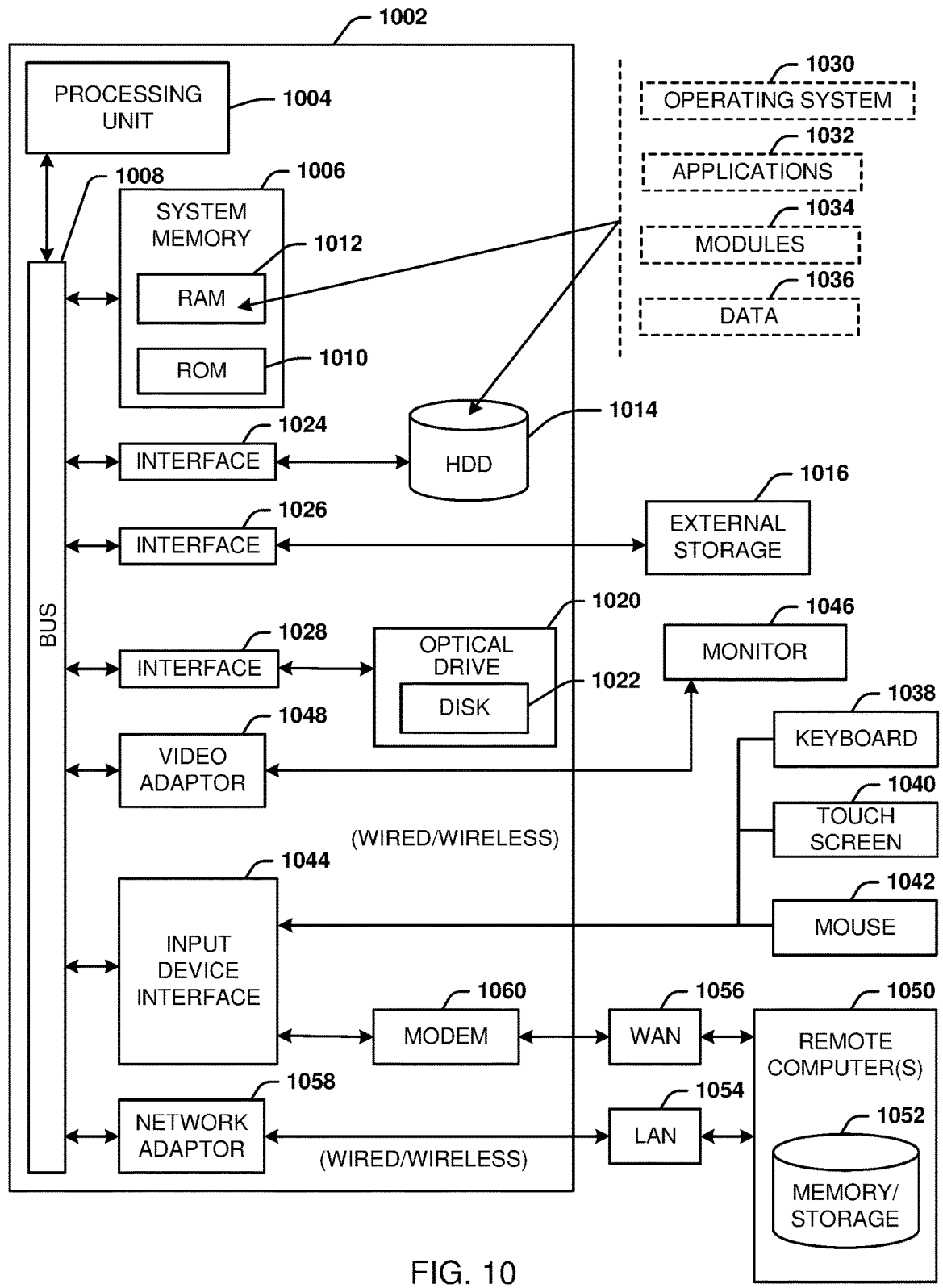
FIG. 10 illustrates an example block diagram of a computer operable to execute certain embodiments of this disclosure.

Each of data center 102a-102n, computer system 106, forecast source 110a-110n, and alert source 112a-112n can be implemented with one or more instances of computer 1002 of FIG. 10. In some examples, proactive data protection based on weather patterns and severity component 108 can be implemented with machine-executable instructions and/or part(s) of computer 1002 of FIG. 10.

Communications network 104 can comprise a computer communications network, such as the Internet, or an isolated private computer communications network.

Computer system 106 can communicate with each of data center 102a-102n, forecast source 110a-110n, and alert source 112a-112n via communications network 104. In some examples, computer system 106 can communicate with each of data center 102a-102n to determine a physical location (sometimes referred to as a geolocation) of each data center. Computer system 106 can communicate with forecast source 110a-110n, and alert source 112a-112n to determine forecasts and alerts, respectively, about the physical location of each data center 102a-102n.

Proactive data protection based on weather patterns and severity component 108 of computer system 106 can analyze these forecasts and alerts to determine when to change a data protection for a particular data center. Alerts can comprise indications that severe events have recently occurred or are occurring—for example, an earthquake. Forecasts can comprise a prediction that a weather or environmental event will happen at some point in the future—for example, that there will be an 80% chance of heavy rain between 4 pm and 9 pm tomorrow.

Proactive data protection based on weather patterns and severity component 108 of computer system 106 can analyze these forecasts and alerts. For example, proactive data protection based on weather patterns and severity component 108 can analyze these forecasts and alerts to determine that there is a sufficient likelihood of flooding at a physical location of data center 102a that will lead to data unavailability. Based on that analysis, proactive data protection based on weather patterns and severity component 108 can send a communication to data center 102a via communications network 104 to increase an amount of data protection for a time that corresponds to a time that the flood prediction spans. Increasing data protection can comprise, for example, increasing a cadence at which snapshots are taken of data in data center 102a from once per 60 minutes to once per 30 minutes.

Figure 7:
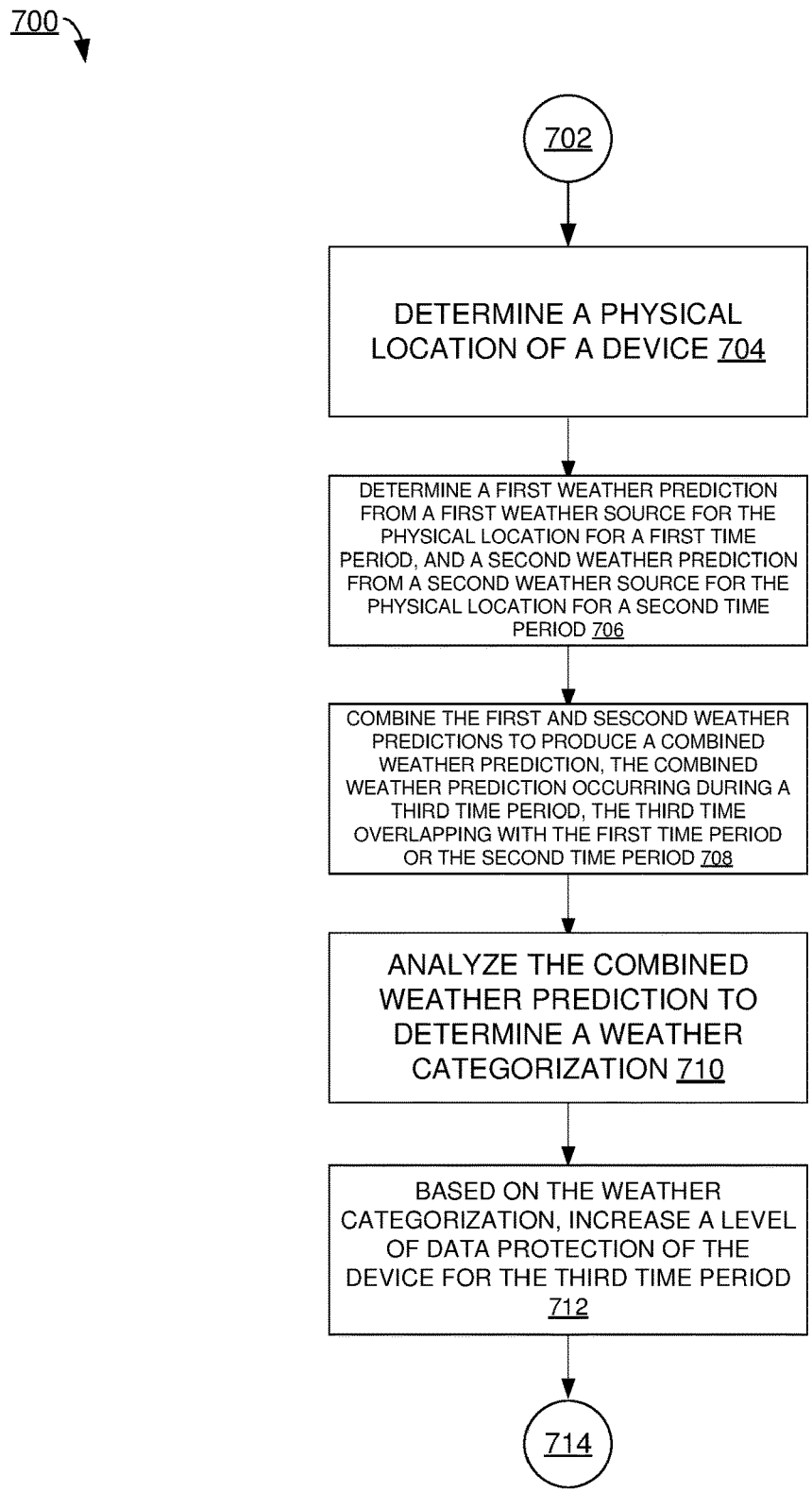
FIG. 7 illustrates an example process flow for proactive data protection based on weather patterns and severity, in accordance with certain embodiments of this disclosure.
Figure 8:
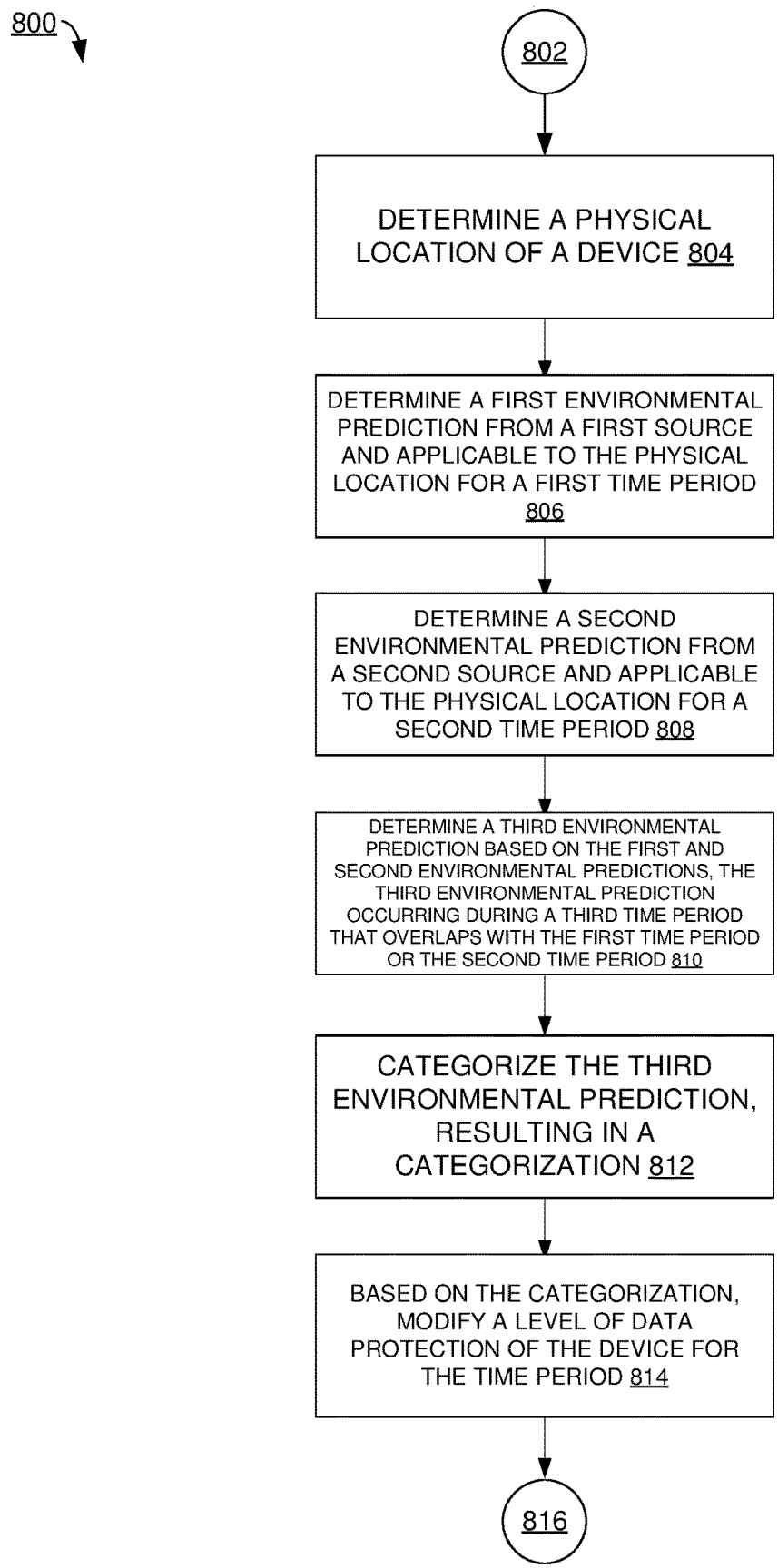
FIG. 8 illustrates an example process flow for proactive data protection based on weather patterns and severity, in accordance with certain embodiments of this disclosure.
Figure 9:
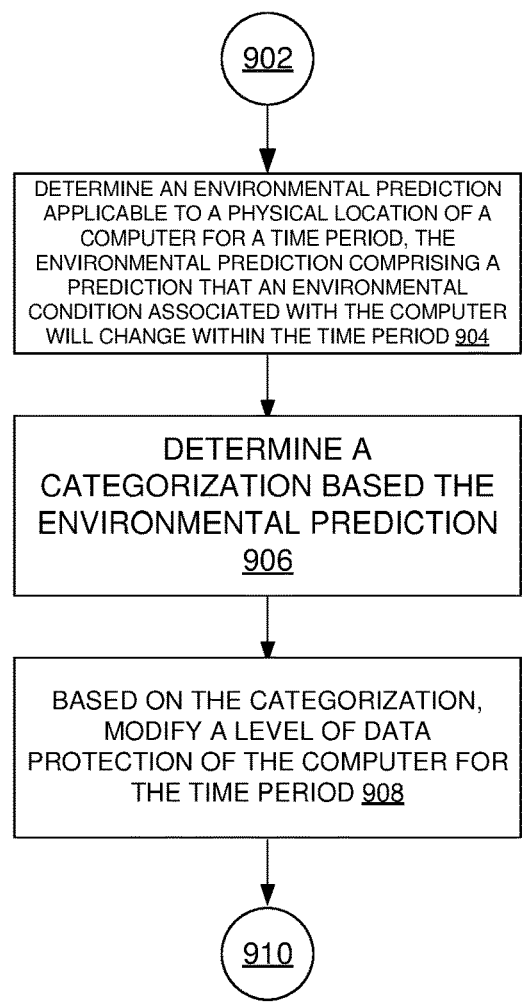
FIG. 9 illustrates an example process flow for proactive data protection based on weather patterns and severity, in accordance with certain embodiments of this disclosure.

In implementing proactive data protection based on weather patterns and severity, proactive data protection based on weather patterns and severity component 108 can implement part(s) of process flow 700 of FIG. 7, process flow 800 of FIG. 8, and/or process flow 900 of FIG. 9.

Figure 2:
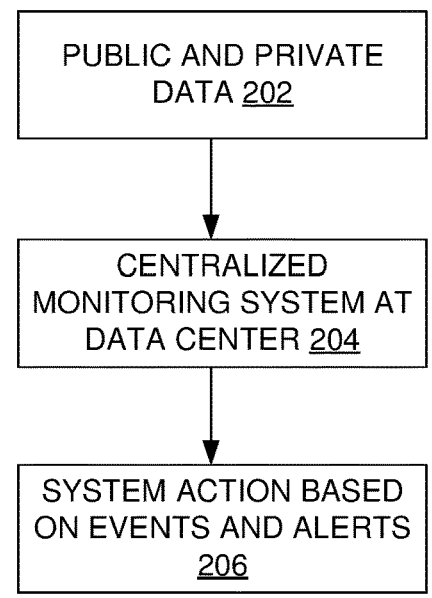
FIG. 2 illustrates another example system architecture that can facilitate proactive data protection based on weather patterns and severity, in accordance with certain embodiments of this disclosure.

FIG. 2 illustrates another example system architecture 200 that can facilitate proactive data protection based on weather patterns and severity, in accordance with certain embodiments of this disclosure. System architecture 200 comprises public and private data 202, centralized monitoring system at data center 204, and system action based on events and alerts 206.

Public and private data 202 can comprise alert and forecast data, such as alerts from alert source 112a-112n, and forecasts from forecast source 110a-110n.

Centralized monitoring system at data center 204 can be similar to proactive data protection based on weather patterns and severity component 108 of FIG. 1. In some examples, centralized monitoring system at data center 204 can actively poll information from sources such as, social media and public or private weather application programming interfaces (APIs), such as those provided as part of public and private data 202. Centralized monitoring system at data center 204 can use this information to provide an alert to individual systems based (such as a data center of data center 102a-102n of FIG. 1) on a defined classification of the weather. A defined classification can comprise a severity (e.g., GREEN, YELLOW, or RED), and a time period for which the classification is in effect.

System action based on events and alerts 206 can comprise an action that proactive data protection based on weather patterns and severity component 108 of FIG. 1 instructs a data center of data center 102a-102n to take. A system action can include decreasing a recovery point objective (RPO) for an existing replication session; mutating a replication session from asynchronous to synchronous, or from synchronous to asynchronous; immediately triggering active backups for certain (or all) data sets or objects; depending on a severity of the events and alerts, failing over objects to a remote site where conditions are normal; and providing high priority alerts to administrators of the corresponding data center.

System architecture 200 can be implemented to mitigate against data loss or down time from environmental events such as harsh weather conditions. Weather patterns and conditions can be actively tracked from public and private sources for a location of a data center, and automated mechanisms can be taken to actively protect data when the weather is, or is forecast to be, sufficiently severe.

System architecture 200 can be implemented to data from public and/or private sources, and implement mechanism to trigger an event based on a severity to the corresponding data center. Depending on the severity, centralized monitoring system at data center 204 can take an action based on policies set. In some examples, data sources can be active conditions, or future predictions that are analyzed. Systems can provide ingress and egress mechanisms to actively gather and process data and publish events.

Figure 3:
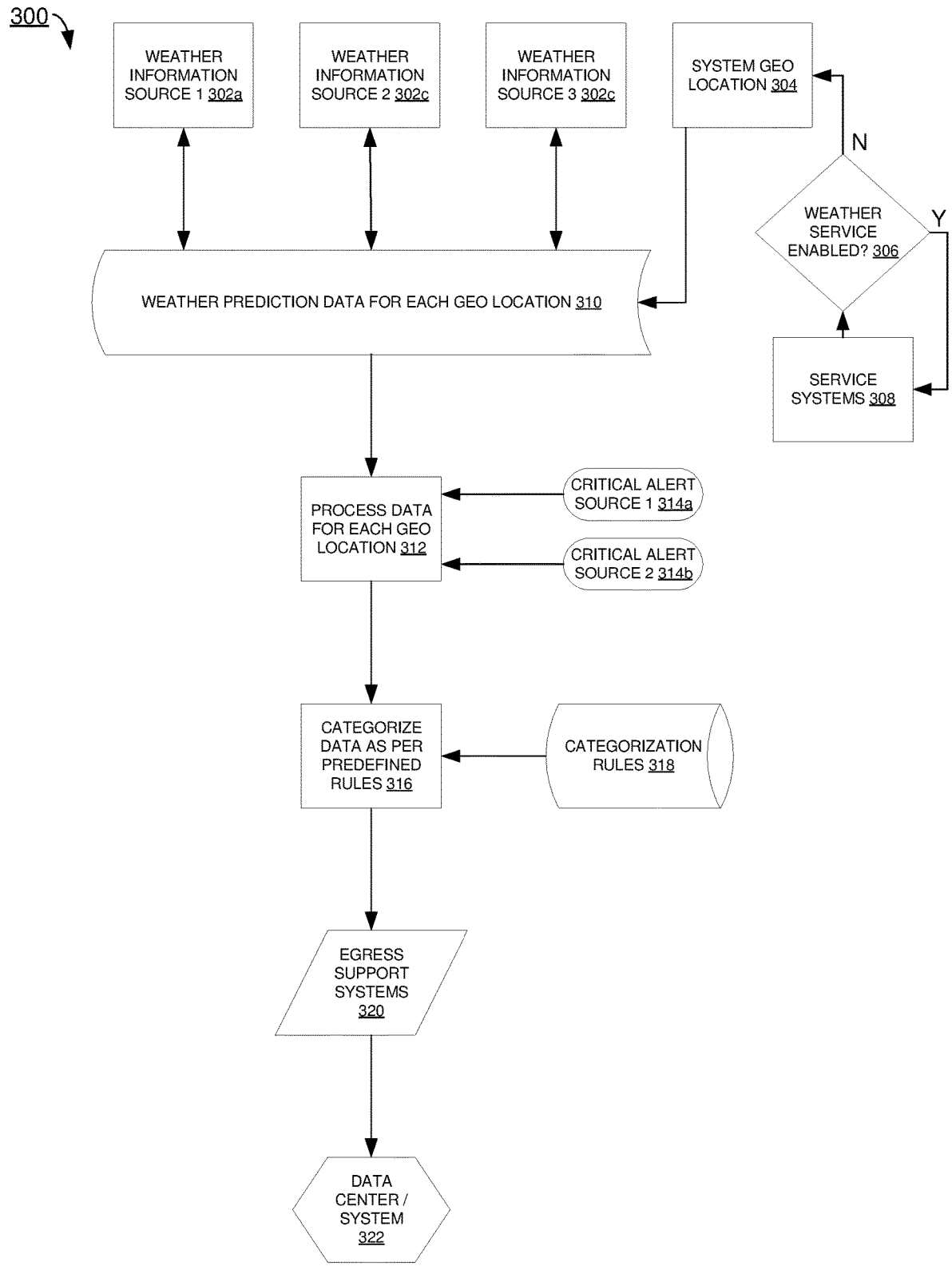
FIG. 3 illustrates another example system architecture that can facilitate proactive data protection based on weather patterns and severity, in accordance with certain embodiments of this disclosure.

FIG. 3 illustrates another example system architecture 300 that can facilitate proactive data protection based on weather patterns and severity, in accordance with certain embodiments of this disclosure. These elements of system architecture can represent information, information flows, information processing, and computer systems. In some examples, all or part of system architecture 300 can be implemented with proactive data protection based on weather patterns and severity component 108 of FIG. 1.

As depicted, system architecture 300 comprises weather information source 1 302a, weather information source 2 302b, weather information source 3 302c, system geo location 304, weather service enabled? 306, service systems 308, weather prediction data for each geo location 310, process data per geo location 312, critical alert source 1 314a, critical alert source 2 314b, categorize data as per predefined rules 316, categorization rules 318, egress API/support systems 320, and data center/system 322.

Service systems 308, which can be part of a data center, can implement a weather service that can both provide geo location (sometimes referred to as physical location) information of where that service system is physically located, and receive and implement instructions on how to modify a data protection of the service system in response to an environmental event. In some examples, service systems 308 can comprise a centralized service system maintained for central processing of data for weather service registered systems maintained by a service vendor (e.g., weather information source 1 302a).

Service systems 308 can be polled by weather service enabled? 306 to determine whether such a weather service is enabled. If it is determined that a weather service is enabled, the physical location of the system, as system geo location 304 can be provided to weather prediction data for each geo location 310. If it is determined that a weather service is not enabled, service systems 308 can continue to be periodically polled for whether a weather service is enabled.

Weather prediction data for each geo location 310 can use system geo location 304 (as well as geo location information for other systems) to query one or more of weather information source 1 302a, weather information source 2 302b, and weather information source 3 302c. While three weather sources are depicted in system architecture 300, it can be appreciated that there can be examples with more or fewer weather sources. Weather prediction data for each geo location 310 can use an application programming interface (API) provided by each weather source to supply the geo location of service systems 308 (and, in some examples, other service systems), and receive back weather forecast information via the same API.

Weather prediction data for each geo location 310 can provide this received weather forecast information to process data per geo location 312. Process data per geo location 312 can also access information about alerts from critical alert source 1 314a and critical alert source 2 314b (there can be examples with more or fewer critical alert sources than the two critical alert sources that are depicted). This information can be accessed via an API, such as by process data per geo location 312 registering with or querying each of critical alert source 1 314a and critical alert source 2 314b for information about alerts relating to the geo location of service systems 308.

Weather prediction data for each geo location 310 can synthesize this weather forecast information (from weather information source 1 302a, weather information source 2 302b, and weather information source 3 302c) and alert information (from critical alert source 1 314a and critical alert source 2 314b) to produce a prediction or status for service systems 308, and provide this information to categorize data as per predefined rules 316.

Categorize data as per predefined rules 316 can apply categorization rules 318 to the information received from process data per geo location 312. Categorization rules 318 can be set by an administrator, and can be similar to classifications 500 of FIG. 5. Once categorized by categorize data as per predefined rules 316, categorize data as per predefined rules 316 can provide this categorization (or an instruction for data protection based on this classification) to egress API/support systems 320, which can be an API to communicate with service systems 308.

Egress API/support systems 320 can provide a corresponding alert to data center/system 322, which can implement a level of data protection based on this alert. Data center/system 322 can comprise a system within a data center that is configured to receive these alerts, and effectuate corresponding data protections for the data center based on the received alerts.

Figure 4:
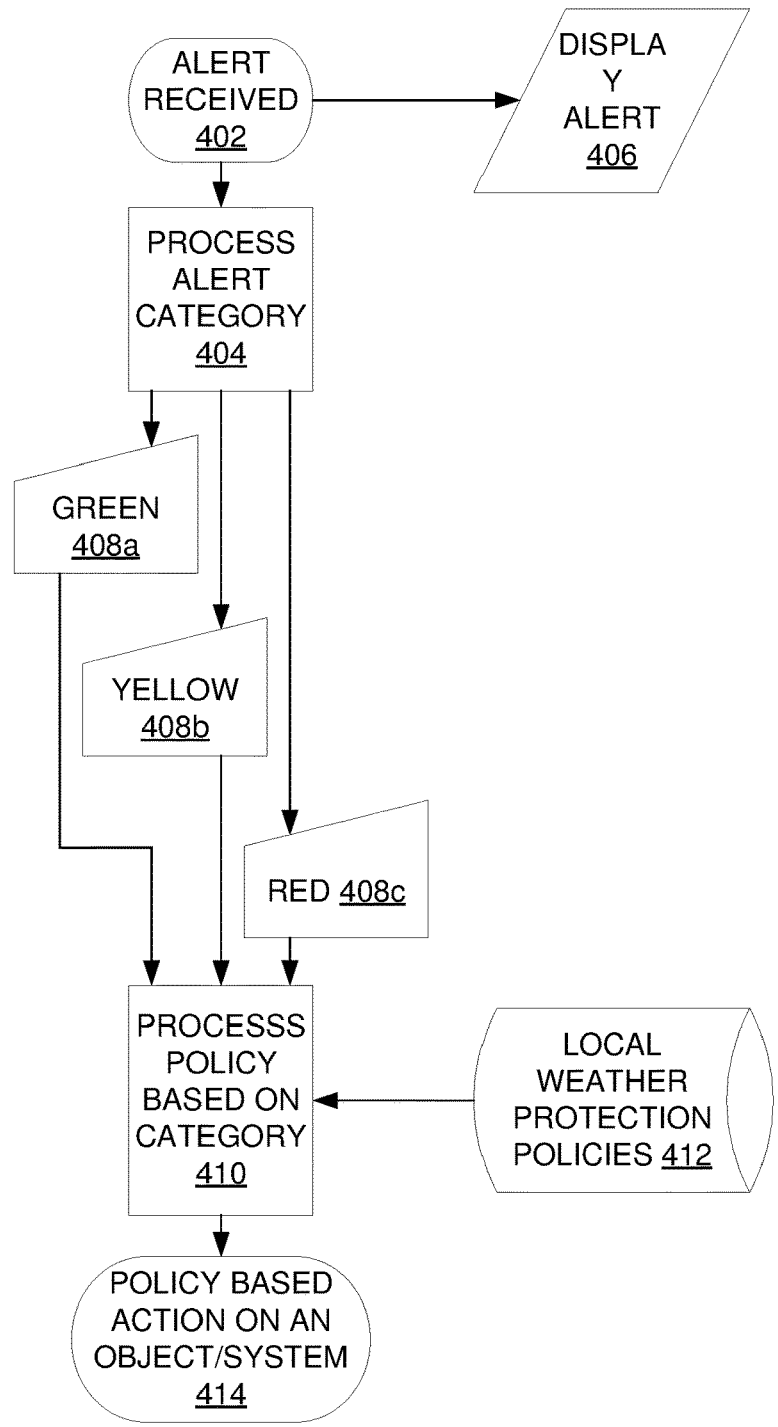
FIG. 4 illustrates an example system architecture for processing alerts that can facilitate proactive data protection based on weather patterns and severity, in accordance with certain embodiments of this disclosure.

FIG. 4 illustrates an example system architecture 400 for processing alerts that can facilitate proactive data protection based on weather patterns and severity, in accordance with certain embodiments of this disclosure. For example, system architecture 400 can be implemented by data center/system 322 of FIG. 3, or one of data center 102*a*-102*n* of FIG. 1 to process alerts received (such as from proactive data protection based on weather patterns and severity component 108).

Alert received 402 can be similar to the alert sent from API/support systems 320 of FIG. 3 to data center/system 322. Process alert category 404 can process this alert, and both cause an indication of alert to be displayed in a user interface with display alert 406, and send the processed alert category on. As depicted, the processed alert category can comprise green 406*a*, yellow 408*b*, or red 408*c*. In this example, yellow 408*b* can be more significant than green 408*a*, and red 408*c* can be more significant than yellow 408*b*.

The processed alert—green 406*a*, yellow 408*b*, or red 408*c*—can be received by process policy based on category 410, which can process the alert accordingly. Process policy based on category 410 can utilize information from local weather prediction policies 412. This information from local weather prediction policies 412 can be provided by user input from an administrator, and can specify a level of data protection to provide for a given alert. For example, one data center can determine that a RED alert indicates taking a snapshot every 30 minutes, while another data center can determine that a RED alert indicates taking a snapshot every 20 minutes.

After process policy based on category 410 processes the policy, this processed policy information can be sent to policy based action on an object/system 414. For example, where process policy based on category 410 determines that the policy for the alert (e.g., RED) calls for changing a cadence of taking snapshots to taking a snapshot every 20 minutes, this information can be communicated to policy based action on an object/system 414 which can implement taking a snapshot every 20 minutes for the data center.

FIG. 5 illustrates example classifications 500 that can facilitate proactive data protection based on weather patterns and severity, in accordance with certain embodiments of this disclosure. Example classifications 500 can be used to classify alerts and weather forecasts, such as by proactive data protection based on weather patterns and severity component 108 of FIG. 1.

As depicted, example classifications 500 comprises five columns—alert/classification 502, wind speed 504, magnitude 506, precipitation 508, and temperature 510. These columns 502-510 can generally comprise metrics for different types of data that, if present, mean that the classification identified in alert/classification 502 will be applied. It can be appreciated that there can be other metrics used for classifying alerts and forecasts.

Wind speed 504 can express wind speed in terms of kilometers per hour (km/h). Magnitude 506 can express an earthquake according to the Richter scale. Precipitation 508 can express rainfall in millimeters (mm). Temperature 510 can express temperature in degrees Celsius (C).

Then, each row of example classifications 500—here depicted as row 512*a* and row 512*b*—can identify a classification, and values for each metric that qualify for the classification. Row 512*a* indicates the metrics that will lead to a classification as RED, and row 512*b* indicates the metrics that will lead to a classification as YELLOW.

In some examples, different metrics can be classified differently. For example, the wind speed within the next two days can be forecast at >150 km/h (indicating a RED alert), and the precipitation can be forecast at <120 mm in the next two days (indicating a YELLOW alert). In such examples, the highest alert indicated by a metric can be used as the alert. So, in this example where the wind speed indicates a RED alert, and the precipitation indicates a YELLOW alert, a RED alert can be used.

Figure 6:
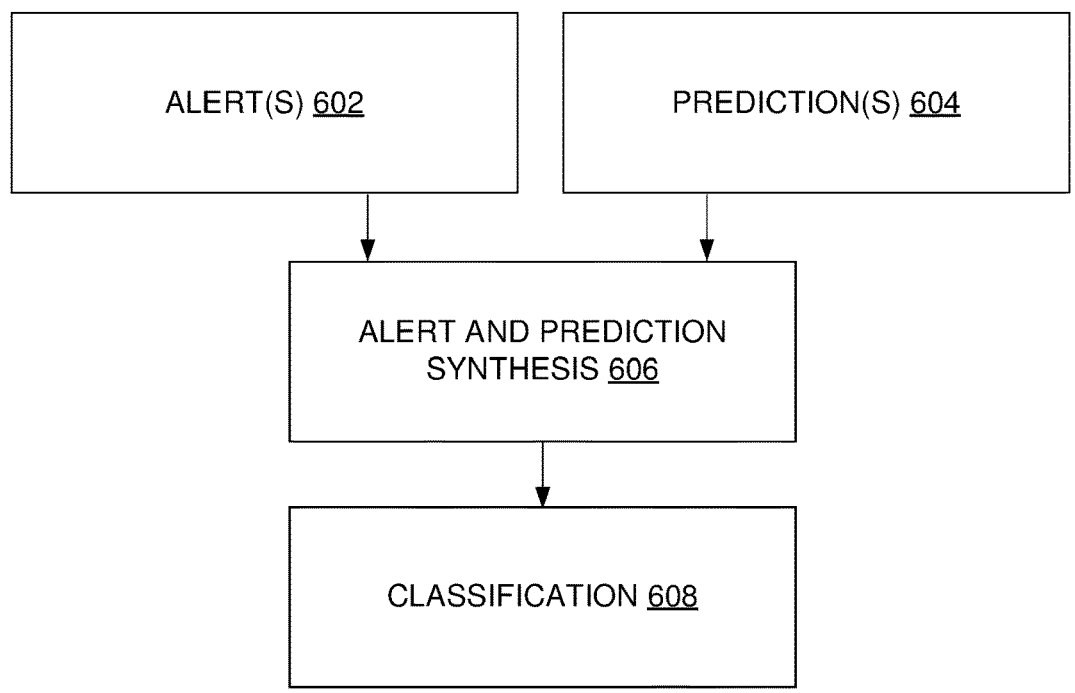
FIG. 6 illustrates an example system architecture for synthesizing alerts and forecasts that can facilitate proactive data protection based on weather patterns and severity, in accordance with certain embodiments of this disclosure.

FIG. 6 illustrates an example system architecture 600 for synthesizing alerts and forecasts that can facilitate proactive data protection based on weather patterns and severity, in accordance with certain embodiments of this disclosure. In some examples, system architecture 600 can be implemented as part of proactive data protection based on weather patterns and severity component 108 of FIG. 1.

System architecture 600 comprises alert(s) 602, prediction(s) 604, alert and prediction synthesis 606, and classification 608. Alert(s) 602 can be similar to alerts provided by critical alert source 1 314*a* and critical alert source 2 314*b* of FIG. 3. Prediction(s) can be similar to weather prediction data provided by weather information source 1 302*a*, weather information source 2 302*b*, and weather information source 3 302*c* of FIG. 3. Classification 608 can be similar to a categorization provided by categorize data as per predefined rules 316 of FIG. 3.

Alert and prediction synthesis 606 can synthesize the various alert(s) and prediction(s) to produce a classification. In some examples, different alerts and predictions can cover different time periods, can provide conflicting information, can provide different types of information (e.g., one weather prediction source relates to temperature, and another weather prediction source relates to precipitation), or can be associated with a different reliability of predictions (e.g., one weather source can be determined to provide more reliable predictions than another weather source). From these different sources, alert and prediction synthesis 606 can produce on classification for a given data center and a given point in time (which can be updated over time).

In some examples where different sources provide conflicting information or provide different types of information (e.g., one source provides precipitation information and another source provides temperature information), alert and prediction synthesis 606 can produce a classification based on a most severe alert or prediction available for a given point in time. In other examples, alert and prediction synthesis 606 can base a classification on a source of alerts or predictions deemed to be most reliable. From these multiple sources, alert and prediction synthesis 606 can produce one classification for a given point in time.

Example Process Flows

FIG. 7 illustrates an example process flow 700 for proactive data protection based on weather patterns and severity, in accordance with certain embodiments of this disclosure. In some examples, one or more embodiments of process flow 700 can be implemented by proactive data protection based on weather patterns and severity component 108 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 800 of FIG. 8 and/or process flow 900 of FIG. 9.

Process flow 700 begins with 702, and moves to operation 704. Operation 704 depicts determining a physical location of a device. In some examples, operation 704 comprises receiving an identification of the physical location from the device, via a communications network. In some examples, this can comprise system geo location 304 of FIG. 3 providing a physical location of service systems 308 via weather service enabled? 306.

After operation 704, process flow 700 moves to operation 706.

Operation 706 depicts determining a first weather prediction from a first weather source for the physical location for a first time period, and a second weather prediction from a second weather source for the physical location for a second time period. In some examples, this can comprise determining a first weather prediction from weather prediction source 1 302a of FIG. 3, and determining a second weather prediction from weather prediction source 2 302b.

After operation 706, process flow 700 moves to operation 708.

Operation 708 depicts combining the first weather prediction and the second weather prediction to produce a combined weather prediction, the combined weather prediction occurring during a third time period, the third time overlapping with the first time period or the second time period. Combining the weather predictions can involve producing a single weather prediction for a given physical location and a given time period.

Sources from multiple weather services (including private and public) can be normalized to increase an accuracy of prediction. That is, data can be normalized to increase a probability that a corresponding forecast or prediction occurs. In some examples, analyzing and synthesizing multiple sources of weather predictions can lead to a more accurate prediction.

In some examples where a time period for multiple weather predictions overlaps, combining two predictions can comprise selecting a more accurate prediction (based on a determined accuracy of the source), or selecting a most critical prediction (e.g., the prediction that would lead to the strongest data protection level).

In some examples, the first weather prediction and second weather prediction can cover different time periods (e.g., one is for noon-4 pm, and the other is for 5-9 pm). In such examples, combining the weather predictions can comprise using the first weather prediction for the first time period, and using the second weather prediction for the second time period.

In some examples, different weather sources can employ different approaches in predicting weather events in terms of a time of event, a length of event, a severity of event, etc. This prediction data can differ from source to source, and in some examples some sources do not normalize their respective predictions. When dealing with data from weather sources that slightly or majorly differs in terms of time, length, or severity, normalization can be applied. A normalization approach can take weather prediction data from different sources and process it to provide a higher predictability.

In an example, Source 1 can predict that the length of a weather event is four hours, from 2:00 pm to 6:00 pm, and Source 2 can predict that the length of a weather event is four hours, from noon to 4 pm. An approach to normalizing data from these two sources can be to predict a weather event for six hours, from noon to 6:00 pm.

In some examples, a severity of a weather event can be determined based on normalizing severity information from multiple weather sources. For example, where a majority of sources predict a higher severity relative to lower severity, the severity can be given the higher designation. In some examples, this approach can be taken to err on the side of safety so as not to underestimate the severity of a weather event.

In some examples, operation 708 comprises normalizing the first weather prediction and the second weather prediction to produce the combined weather prediction. Normalizing the predictions can comprise converting some data from a first range or format into a common range or format, so that predictions from multiple sources can be directly compared.

After operation 708, process flow 700 moves to operation 710.

Operation 710 depicts analyzing the combined weather prediction to determine a weather categorization. In some examples, operation 710 can be implemented in a similar manner as process data for each geo location 312 of FIG. 3, and categorize data as per predefined rules 316.

In some examples, the weather categorization is defined based on user input. For example, categorization rules 318 of FIG. 3 can be defined by an administrator. In some examples, a base weather categorization can be performed by learning from multiple weather data sources for a physical location and then categorizing the combined prediction (e.g., as RED, YELLOW, or GREEN). A user can provide user input to specify rules and policies that can affect how a received category of alert (e.g., RED, YELLOW, or GREEN) can be applied to data protection of storage objects.

In some examples, operation 710 comprises receiving a weather alert separate from the first weather prediction and the second weather prediction, wherein the determining of the weather categorization comprises determining the weather categorization based on the weather alert, the first weather prediction, and the second weather prediction.

In some examples, the weather alert is a first weather alert, and wherein the determining of the weather categorization comprises determining the weather prediction based on the first weather alert received from a first weather alert source and a second weather alert received from a second weather alert source. That is, there can be multiple sources of weather alerts.

After operation 710, process flow 700 moves to operation 712.

Operation 712 depicts, based on the weather categorization, increasing a level of data protection of the device for the third time period. In some examples, this can comprise changing a rate at which data protection (e.g., a backup or snapshot) is taken for a duration of the third time period. In other examples, this can comprise failing over from the device to a second device, such as from a first replication server to a second replication server at a second physical location that is not subject to a critical weather alert.

In some examples, the level of data protection comprises a schedule for performing a data backup operation for the device, and operation 712 comprises decreasing an amount of time between performing iterations of the data backup, replication, or snapshot operation from a first amount of time to a second amount of time. That is, an action taken can be to increase a cadence of performing backups, snapshots, replications, or other data protection techniques.

After operation 712, process flow 700 moves to 714, where process flow 700 ends.

FIG. 8 illustrates an example process flow 800 for proactive data protection based on weather patterns and severity, in accordance with certain embodiments of this disclosure. In some examples, one or more embodiments of process flow 800 can be implemented by proactive data protection based on weather patterns and severity component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 700 of FIG. 7 and/or process flow 900 of FIG. 9.

Process flow 800 begins with 802, and moves to operation 804. Operation 804 depicts determining a physical location of a device. In some examples, operation 804 can be performed in a similar manner as operation 704 of FIG. 7.

After operation 804, process flow 800 moves to operation 806.

Operation 806 depicts determining a first environmental prediction from a first source and applicable to the physical location for a first time period. In some examples, operation 806 can be performed in a similar manner as operation 706 of FIG. 7.

In some examples, the first environmental prediction comprises a probability that an environmental event will occur at the physical location during the time period. In some examples, the first environmental prediction comprises a prediction of a time estimate within the time period representative of when an environmental event is predicted to begin at the physical location. In some examples, the first environmental prediction comprises a prediction of an amount of impact to the device from an environmental event predicted to occur at the physical location during the time period. That is, an environmental prediction can comprise a probability of occurring, a time when it is predicted to occur, and an impact if it does occur.

In some examples, operation 806 comprises receiving a registration message indicative of registering for environmental alert, and registering with an environmental prediction service to obtain the first environmental prediction from the environmental prediction service. For example, proactive data protection based on weather patterns and severity component 108 of FIG. 1 can interface with both a weather source (e.g., forecast source 110a) and a data center (e.g., data center 102a).

After operation 806, process flow 800 moves to operation 808.

Operation 808 depicts determining a second environmental prediction from a second source and applicable to the physical location for a second time period. In some examples, operation 808 can be performed in a similar manner as operation 706 of FIG. 7.

After operation 808, process flow 800 moves to operation 810.

Operation 810 depicts determining a third environmental prediction based on the first environmental prediction and the second environmental prediction, the third environmental prediction occurring during a third time period that overlaps with the first time period or the second time period. In some examples, operation 810 can be performed in a similar manner as operation 708 of FIG. 7.

After operation 810, process flow 800 moves to operation 812.

Operation 812 depicts categorizing the third environmental prediction, resulting in a categorization. In some examples, operation 812 can be performed in a similar manner as operation 710 of FIG. 7.

After operation 812, process flow 800 moves to operation 810.

Operation 814 depicts, based on the categorization, modifying a level of data protection of the device for the time period. In some examples, operation 814 can be performed in a similar manner as operation 712 of FIG. 7.

In some examples, operation 814 comprises modifying the level of data protection from a first level to a second level. In such examples, operation 814 can comprise, after the time period concludes, modifying, by the system, the level of data protection from the second level back to the first level. That is, after the time period ends, the device can be returned to the prior, normal level of data protection.

In some examples, the level of data protection comprises a backup, a replication, or a snapshot. The level of data protection can also include a parameter of the data protection, such as a rate at which a snapshot is taken (e.g., every 30 minutes).

After operation 814, process flow 800 moves to 812, where process flow 800 ends.

FIG. 9 illustrates an example process flow 900 for proactive data protection based on weather patterns and severity, in accordance with certain embodiments of this disclosure. In some examples, one or more embodiments of process flow 900 can be implemented by proactive data protection based on weather patterns and severity component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 700 of FIG. 7 and/or process flow 800 of FIG. 8.

Process flow 900 begins with 902, and moves to operation 904. Operation 904 depicts determining an environmental prediction applicable to a physical location of a computer for a time period, wherein the environmental prediction comprises a prediction that an environmental condition associated with the computer will change at a time within the time period. In some examples, operation 904 can be implemented in a similar manner as operations 704-706 of FIG. 7.

After operation 904, process flow 900 moves to operation 906.

Operation 906 depicts determining a categorization based the environmental prediction. In some examples, operation 906 can be implemented in a similar manner as operation 710 of FIG. 7.

In some examples, the environmental prediction comprises a prediction of at least one of a flood, a rain storm with a threshold amount of rain, a wind storm with a threshold amount of wind, a tornado, a hurricane, a derecho, a hail storm, a snow storm, a sand storm, a volcanic eruption, a critical weather condition, or a disaster.

In some examples, operation 906 comprises determining the categorization based on an alert of an environmental event that is currently occurring or has occurred recently not longer than a defined threshold time ago. In some examples, the environmental event comprises an earthquake, a tsunami, a power outage, or a spreading fire. That is, the environmental event can be an immediate and/or non-predictable event rather than a forecast event.

After operation 906, process flow 900 moves to operation 908.

Operation 908 depicts, based on the categorization, modifying a level of data protection of the computer for the time period. In some examples, operation 908 can be implemented in a similar manner as operation 712 of FIG. 7.

In some examples, the computer is a first computer. In such examples, modifying the level of data protection for the first computer can comprise prior to the time period, initiating a fail over procedure that switches a process from being performed by the first computer to being performed by a second computer. That is, modifying the data protection can comprise failing over to another computer (such as where replication servers are used).

In some examples, the physical location is a first physical location, and the fail over procedure comprises selecting the second computer based on the second computer being determined to be at a second physical location to which the environmental prediction is not applicable, or where the secondary physical location is not predicted to have a critical environmental event within a predetermined amount of time after the selecting of the second computer. That is, where modifying the data protection can comprise failing over to another computer, this other computer can be physically located out of harm's way.

After operation 908, process flow 900 moves to 910, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of data center 102a-102n, computer system 106, forecast source 110a-110n, alert source 112a-112n, and/or proactive data protection based on weather patterns and severity component 108 of FIG. 1. In some examples, computing environment 1000 can implement one or more embodiments of the process flows of FIGS. 7-9 to facilitate automatic identification of computer agents for throttling.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   determining a physical location of a device;
   identifying a defined group of weather categorizations, wherein respective weather categorizations of the defined group of weather categorizations correspond to respective data protection actions for adjusting respective levels of data protection, and wherein the respective weather categorizations correspond to respective multiple types of weather predictions;
   determining a first weather prediction from a first weather source for the physical location for a first time period, and a second weather prediction from a second weather source for the physical location for a second time period;
   combining the first weather prediction and the second weather prediction to produce a combined weather prediction, the combined weather prediction occurring during a third time period, the third time period overlapping with the first time period and the second time period;
   analyzing the combined weather prediction to determine a weather categorization from the defined group of weather categorizations, resulting in a determined weather categorization,
      wherein the first weather prediction corresponds to a first weather categorization having a first severity,
      wherein the second weather prediction corresponds to a second weather categorization having a second severity, and
      wherein the determined weather categorization corresponds to a higher severity of the first weather categorization and the second weather categorization;
   and
   based on the determined weather categorization, implementing, at a current time, increasing a level of data protection of the levels of data protection of the device for the third time period, wherein the third time period occurs at a future time.

2. The system of claim 1, wherein the combining of the first weather prediction and the second weather prediction comprises:
   normalizing the first weather prediction and the second weather prediction to produce the combined weather prediction.

3. The system of claim 1, wherein the determined weather categorization is defined based on user input.

4. The system of claim 1, wherein the level of data protection comprises a schedule for performing a data backup, replication, or snapshot operation for the device, and wherein the increasing of the level of data protection of the device comprises:
   decreasing an amount of time between performing iterations of the data backup, replication, or snapshot operation from a first amount of time to a second amount of time.

5. The system of claim 1, wherein the operations further comprise:
   receiving a weather alert separate from the first weather prediction and the second weather prediction, wherein the determining of the determined weather categorization comprises determining the determined weather categorization based on the weather alert, the first weather prediction, and the second weather prediction.

6. The system of claim 5, wherein the weather alert is a first weather alert, and wherein the determining of the determined weather categorization comprises:
   determining the weather prediction based on the first weather alert received from a first weather alert source and a second weather alert received from a second weather alert source.

7. The system of claim 1, wherein the determining of the physical location of the device comprises:

receiving an identification of the physical location from the device, via a communications network.

8. The system of claim 1, wherein the first weather source comprises a first weather service, wherein the second weather source comprises a second weather service, and wherein the first weather service differs from the second weather service.

9. A method comprising:
  determining, by a system comprising a processor, a physical location of a device;
  identifying, by the system, a group of environmental categorizations, wherein respective environmental categorizations of the group of environmental categorizations correspond to different data protection actions, and wherein multiple types of weather predictions correspond to the respective environmental categorizations;
  receiving, by the system and from the device, a registration message indicative of registering for environmental alerts; and
  registering, by the system, with a first source to obtain environmental predictions from the first source;
  determining, by the system, a first environmental prediction of the environmental predictions from the first source and applicable to the physical location for a first time period;
  determining, by the system, a second environmental prediction from a second source and applicable to the physical location for a second time period;
  determining, by the system, a third environmental prediction based on the first environmental prediction and the second environmental prediction, the third environmental prediction occurring during a third time period that overlaps with the first time period or the second time period;
  categorizing, by the system, the third environmental prediction, resulting in a selected categorization from the group of environmental categorizations, wherein the first environmental prediction corresponds to a first categorization, wherein the second environmental prediction corresponds to a second categorization, and wherein the selected categorization corresponds to a higher categorization of the first categorization and the second categorization; and
  based on the selected categorization, modifying, by the system and at a current time, a level of data protection of the device for the third time period, wherein the third time period occurs at a future time.

10. The method of claim 9, wherein the first environmental prediction comprises a probability that an environmental event will occur at the physical location during the first time period.

11. The method of claim 9, wherein the first environmental prediction comprises a prediction of a time estimate within the first time period representative of when an environmental event is predicted to begin at the physical location.

12. The method of claim 9, wherein the first environmental prediction comprises a prediction of an amount of impact to the device from an environmental event predicted to occur at the physical location during the first time period.

13. The method of claim 9, wherein modifying the level of data protection of the device for the third time period comprises modifying the level of data protection from a first level to a second level, and further comprising:
  after the third time period concludes, modifying, by the system, the level of data protection from the second level back to the first level.

14. The method of claim 9, further comprising:
  receiving, by the system and from the device, a registration message indicative of registering the device for environmental alerts; and
  registering, by the system, with an environmental prediction service to obtain environmental predictions regarding the device from the environmental prediction service.

15. The method of claim 9, wherein the level of data protection comprises a backup, a replication, or a snapshot.

16. A non-transitory computer-readable medium comprising instructions that, in response to execution, cause a system comprising a processor to perform operations, comprising:
  determining a group of environmental categorizations, wherein each environmental categorization of the group of environmental categorizations corresponds to a different data protection action;
  determining a first environmental prediction applicable to a physical location of a computer for a time period, wherein the environmental prediction comprises a prediction that an environmental condition associated with the computer will change at a time within the time period;
  determining a categorization from the group of environmental categorizations based the environmental prediction, resulting in a determined categorization, wherein the determined categorization corresponds to a higher of a first categorization the first environmental prediction and a second categorization of a second environmental prediction applicable to the physical location of the computer for the time period; and
  based on the determined categorization, modifying a level of data protection of the computer for the time period, wherein the time period begins at a future time.

17. The non-transitory computer-readable medium of claim 16, wherein the computer is a first computer, and wherein modifying the level of data protection for the first computer comprises:
  prior to the time period, initiating a fail over procedure that switches a process from being performed by the first computer to being performed by a second computer.

18. The non-transitory computer-readable medium of claim 17, wherein the physical location is a first physical location, and the fail over procedure comprises:
  selecting the second computer based on the second computer being determined to be at a second physical location to which the environmental prediction is not applicable, or where the second physical location is not predicted to have a critical environmental event within a predetermined amount of time after the selecting of the second computer.

19. The non-transitory computer-readable medium of claim 16, wherein the environmental prediction comprises a prediction of at least one of a flood, a rain storm with a threshold amount of rain, a wind storm with a threshold amount of wind, a tornado, a hurricane, a derecho, a hail storm, a snow storm, a sand storm, a volcanic eruption, a critical weather condition, or a disaster.

20. The non-transitory computer-readable medium of claim 16, wherein the operations further comprise:

determining the determined categorization based on an alert of an environmental event that is currently occurring or has occurred recently not longer than a defined threshold time ago.

* * * * *